United States Patent [19]
Bach et al.

[11] Patent Number: 4,609,078
[45] Date of Patent: Sep. 2, 1986

[54] SPRING ENTRAPMENT OF SPLIT WEDGE FLOATATION DEVICE

[75] Inventors: Lloyd G. Bach, South Bend; James J. Colpaert, Granger, both of Ind.

[73] Assignee: Allied Corporation, Morristown, N.J.

[21] Appl. No.: 804,234

[22] Filed: Dec. 3, 1985

Related U.S. Application Data

[63] Continuation of Ser. No. 556,651, Nov. 30, 1983, abandoned.

[51] Int. Cl.[4] .............................................. F16D 65/00
[52] U.S. Cl. .................................. 188/73.43; 188/73.45
[58] Field of Search ............... 188/73.43, 73.44, 73.45, 188/71.1, 72.4, 73.34, 73.35, 73.42, 1.11, 151 A

[56] References Cited

U.S. PATENT DOCUMENTS

| 3,421,602 | 1/1969 | Craske | 188/73.43 |
| 3,838,754 | 10/1974 | Schoenhenz | 188/73.3 |
| 4,084,665 | 4/1978 | Burnett | 188/73.45 |
| 4,225,017 | 9/1980 | Op den Camp | 188/73.44 X |
| 4,285,417 | 8/1981 | Ostwald | 188/73.43 X |
| 4,310,075 | 1/1982 | Johannesen et al. | 188/73.45 |
| 4,310,076 | 1/1982 | Ikeda | 188/73.35 |
| 4,418,798 | 12/1983 | Johannesen et al. | 188/73.45 |
| 4,436,187 | 3/1984 | Bolenbaugh et al. | 188/73.45 |
| 4,448,289 | 5/1984 | Gumkowski et al. | 188/73.45 |

FOREIGN PATENT DOCUMENTS

| 0049187 | 4/1982 | European Pat. Off. | |
| 0143941 | 6/1985 | European Pat. Off. | 188/73.43 |
| 2250843 | 4/1974 | Fed. Rep. of Germany | 188/73.43 |
| 2722614 | 12/1977 | Fed. Rep. of Germany | |
| 2027141 | 2/1980 | United Kingdom | |
| 2041121 | 9/1980 | United Kingdom | 188/73.44 |

Primary Examiner—Bruce H. Stoner, Jr.
Assistant Examiner—Michael P. Gilday
Attorney, Agent, or Firm—Larry J. Palguta; Ken C. Decker

[57] ABSTRACT

A disc brake assembly (10) includes a caliper (22) movably supported by a torque member (36). The caliper (22) and torque member (36) each have lateral recesses (44, 46, 48, 50) defining axially extending apertures (52, 54) between the caliper (22) and torque member (36), with a pair of wedge-shaped members (66, 68) disposed in each aperture to maintain the caliper in radial and circumferential position relative to the torque member while allowing lateral movement therebetween. The wedge-shaped members (66, 68) are biased inwardly by an improved dual purpose spring member (72) which traverses a portion of the exterior perimeter of the torque member (36) and engages the ends of the respective pins. The spring member (72) includes enlarged end members (74) each comprising a coil presenting a flat surface (75) for engaging the end of the respective pin (66, 68) to urge the pin inwardly of the aperture (52, 54), the enlarged end members (74) being disposed within the openings (90) of the apertures so that the enlarged end members (74) maintain the radial and circumferential position of the caliper (22) relative to the torque member (36) if the wedge-shaped pins (66, 68) are damaged or should fail.

9 Claims, 6 Drawing Figures

SPRING ENTRAPMENT OF SPLIT WEDGE FLOATATION DEVICE

This is a continuation of abandoned application Ser. No. 556,651 filed Nov. 30, 1983.

The invention relates to a floating caliper disc brake.

Floating caliper disc brakes include a rotor having friction faces on opposite sides thereof and a caliper cooperating with a pair of friction elements to urge the pair of friction elements into engagement with the friction faces to retard rotation of the rotor during brake application. A non-rotating torque member carries the caliper in substantially fixed radial and circumferential position relative to the rotor. The caliper is movable, or floats, axially to a limited extent relative to the rotor and torque member.

A brake application is effected by a fluid motor carried by the caliper. When the fluid motor is supplied with a pressurized fluid, it forces one of the friction elements against a friction face of the brake disc. Reaction forces acting through the caliper cause the caliper to slide axially relative to the torque member and rotor so that the other friction element is forced against the other friction face of the disc brake.

The floating caliper and torque member are coupled together to allow for axial movement of the caliper relative to the fixed torque member. Burnette U.S. Pat. No. 4,084,665 entitled "DISC BRAKE AND MOUNTING MEANS THEREFOR" and issued April 18, 1978, illustrates such a disc brake assembly and a means for floatably mounting the caliper to the fixed torque member. The caliper is supported by the torque member through pins having an elastomeric ring construction. Ritsema U.S. Pat. No. 4,318,458 entitled "DISC BRAKE AND CONNECTING ASSEMBLY THEREFOR" and issued Mar. 9, 1983, illustrates another construction having pins for slidably coupling together the caliper and fixed torque member. Both cited patents utilize a screw attached to the torque member and acting in conjunction with either a pin tab or a washer to retain a pin within the grooved recess between the caliper and torque member. U.S. Pat. No. 4,418,798 entitled "DISC BRAKE WITH WEDGE PINS", inventor Donald D. Johannesen et al., issued Dec. 6, 1983, discloses another construction for slidably coupling together the caliper and torque member, and is incorporated by reference herein. This patent describes the use of wedge-shaped pins which engage one another along respective inclined surfaces while disposed within an axially extending aperture or recess located between the caliper and torque member. The pins are urged inwardly by a resilient spring member engaging sockets within the respective ends of the pins, whereby the pins fill the axially extending recess so that the caliper and torque member are not in direct engagement. This eliminates frictional engagement between the caliper and torque member both during and after braking when the caliper assembly returns to its initial deactivated position. Thus, the confronting surfaces of the caliper and fixed torque member do not come into engagement and this eliminates any frictional resistance to the return of the caliper to its initial deactivated position. This assists, along with runout or wobble of the disc brake assembly, to reposition the caliper axially relative to the torque member, so that the friction elements do not drag on the rotating brake disc. It further increases the wear life of the friction elements, prevents a decrease in fuel consumption due to dragging of the brakes, and provides a more efficiently operable and reliable disc brake assembly.

The present invention is an improved means for retaining the wedge-shaped pins in proper position within the axially extending aperture located between and defined by axially extending recesses of the torque member and caliper. Although the wedge-shaped pins provide an improved mounting of the caliper relative to the torque member, it is possible that the pins may be damaged or destroyod during the operational life of the disc brake assembly. Therefore, it is important to first maintain the pins in their proper position within the axially extending aperture during the operational life of the disc brake assembly, and to provide, in the event there is destruction or failure of the wedge-shaped pins, for the caliper to be maintained in radial and circumferential position relative to the torque member. If the pins should fail, the caliper could separate from the torque member and cause failure of the disc brake assembly. Therefore, it is an object of the present invention to maintain the caliper in proper radial and circumferential alignment relative to the torque member if the pins should fail to maintain that alignment.

The present invention comprises a dual purpose resilient spring which engages the respective ends of the wedge-shaped pin members to resiliently urge the pin members inwardly so that they are maintained in proper position within the axially extending aperture and thereby maintain the radial and circumferential alignment of the caliper relative to the torque member. The dual purpose spring traverses an exterior portion of the torque member to engage an abutment of the torque member and thus be secured in position relative to the torque member. The spring includes enlarged end members each comprising a coil which presents a flat surface for engaging the end of the respective pin to urge the pin inwardly of the aperture, with the enlarged spring end members disposed within the axially extending aperture. Because the enlarged end members are disposed interiorly of the axially extending aperture, the enlarged end members will maintain the radial and circumferential alignment of the caliper relative to the torque member if the wedge-shaped pins are damaged or should fail. The enlarged end members may also comprise a plurality of coils that present not only a flat surface for maintaining the pins in position within the aperture, but which provide further resilient biasing force urging the pins inwardly and provide additional support for maintaining the alignment of the caliper relative to the torque member if the pins are damaged or should fail.

The invention is described in detail below with reference to the drawings which illustrate the embodiments of the invention.

Figure 1:
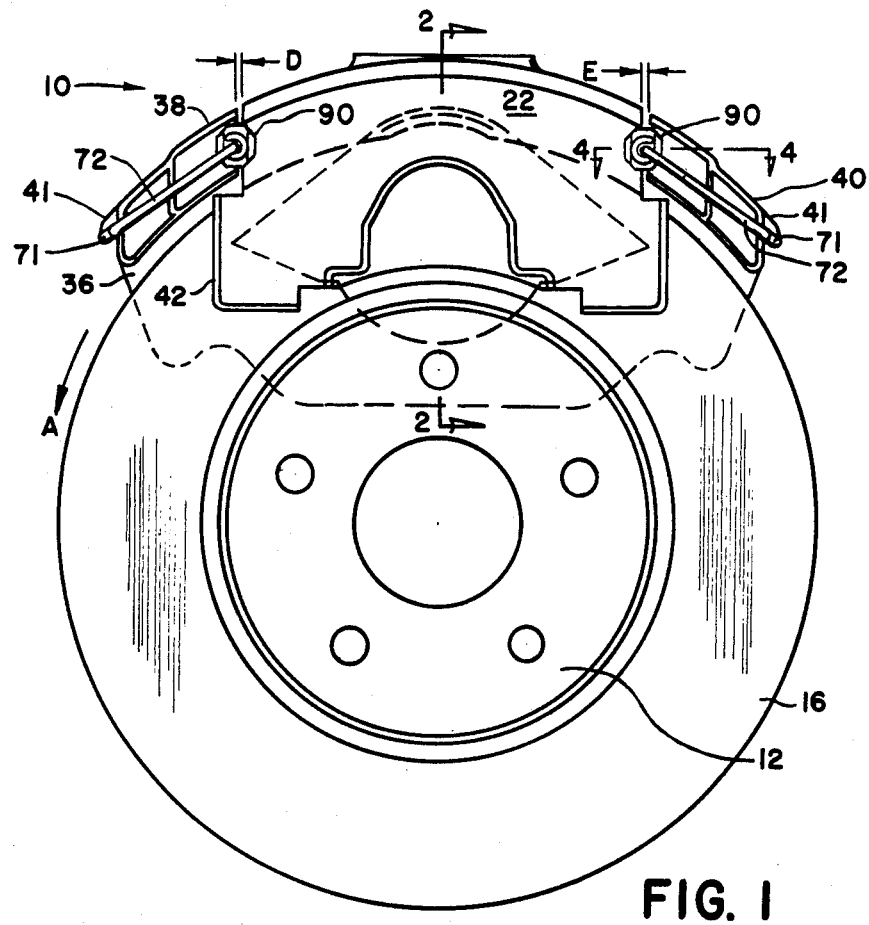
FIG. 1 is a side elevational view of the disc brake made pursuant to the present invention.
Figure 2:
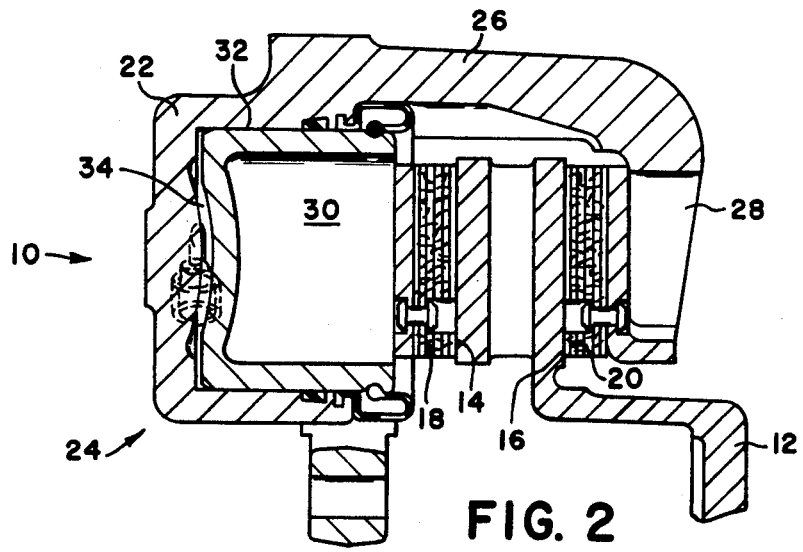
FIG. 2 is a cross-sectional view taken substantially along line 2—2 of FIG. 1.

Referring to FIGS. 1 and 2, a disc brake indicated generally by reference number 10 includes a rotor 12 rotatable with a wheel assembly (not shown) and having a pair of opposed friction faces 14 and 16. A pair of friction elements 18, 20 are disposed adjacent friction faces 14 and 16, respectively. The friction elements 18 and 20 are urged into braking engagement with their corresponding friction faces 14 and 16 when a brake application is effected. A caliper 22 includes a fluid motor portion 24 disposed adjacent the friction face 14, a bridge portion 26 that traverses the periphery of the rotor 12, and a radially inwardly extending reaction portion 28 which is disposed adjacent the face 16. The fluid motor portion 24 includes a piston 30 slidably arranged in a bore 32 defined within caliper 22. When a brake application is effected, fluid is communicated to the variable-volume chamber 34 defined between the end of the piston and corresponding end of bore 32 to urge piston 30 toward the rotor 12. Piston 30 urges friction element 18 into engagement with friction face 14 and reaction forces acting through the bridge portion 26 move the caliper 22 to bias friction element 20 into engagement with friction face 16. When the brake is subsequently released, piston 30 returns to its brakerelease position.

Figure 3:
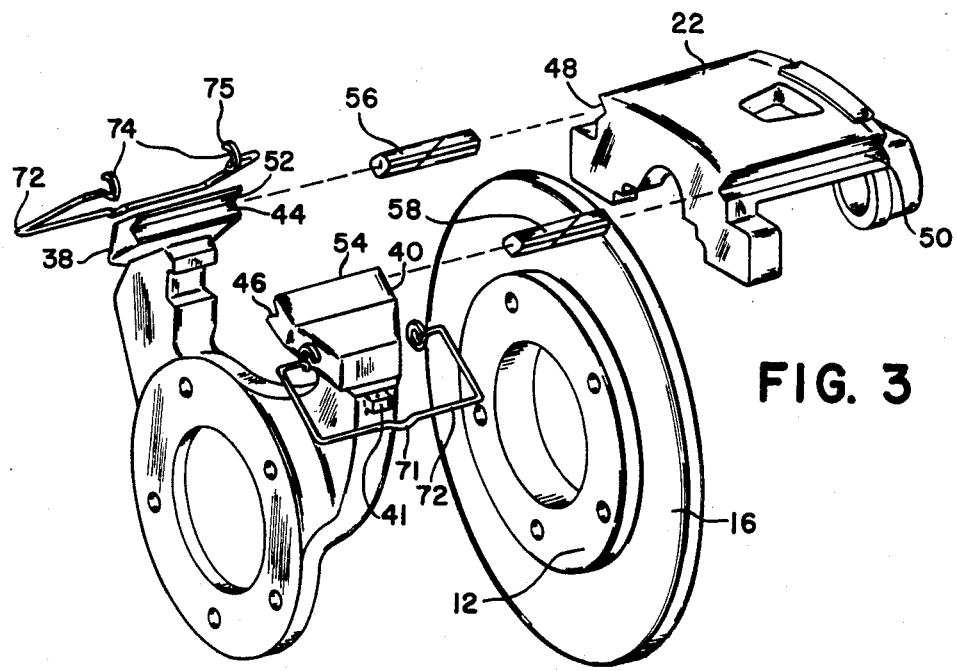
FIG. 3 is an exploded view of the disc brake assembly utilizing the present invention.
Figure 4:
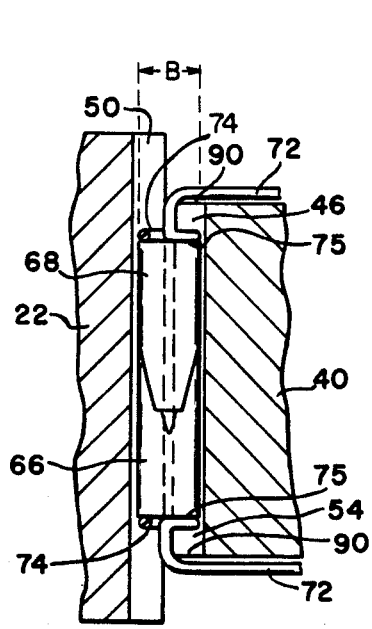
FIG. 4 is a fragmentary cross-sectional view taken substantially along line 4—4 of FIG. 1.

Turning to FIG. 1, caliper 22 is mounted for axial movement with respect to the rotor 12 by a torque member 36, which is secured to a non-rotating portion of the axle assembly (not shown). The torque member 36 includes a pair of circumferentially spaced arms 38, 40, that define a recess 42 therebetween. The caliper 22 is received in the recess 42 between torque member arms 38 and 40. Viewing FIG. 1, it will be seen that the caliper 22 is spaced from the torque member 38 by clearance "D". Likewise, the caliper is spaced from the arm 40 by a clearance "E". In FIGS. 3 and 4, it can be seen that the torque member arms 38 and 40 and the caliper 22 include matching V-shaped recesses or grooves 44, 46, 48, and 50, respectively. Recesses 44 and 48, and recesses 46 and 50, when placed in registry with each other, define substantially square-shaped apertures 52 and 54, respectively. Apertures 52 and 54 extend axially between the arms 38 and 40 and caliper 22.

Figure 5:
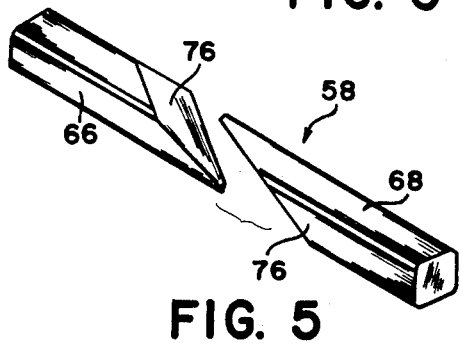
FIG. 5 is a isometric view of the pair of wedge-shaped members comprising one pin.

A pair of pins 56 and 58 are received in the apertures 52 and 54, respectively. FIG. 5 illustrates the pin 58 which includes a pair of wedge-defining members 66 and 68. The wedge members 66 and 68 are identical and complementary to each other, each having a transverse dimension B (see FIG. 4), and each includes an inclined surface 76. The members 66 and 68 overlap each other within the aperture 54 so that the members cooperate to define a cross-section similar to the cross-section of pin 56. FIGS. 1 and 4 illustrate that the wedge members 66 and 68 cooperate to space apart the caliper 22 and the torque arm member 40. As a result, caliper 22 and torque member 40 define clearance "E". Correspondingly, the wedge members of pin 56 cooperate to space apart caliper 22 and torque arm member 38 to define clearance "D".

As illustrated in FIGS. 1, 3, and 4, a C-shaped spring 72 (a portion of which is illustrated by FIG. 4) includes enlarged end members 74 which are received in an axially extending aperture. Spring 72 biases members 66 and 68 toward each other within apertures 52, 54. Consequently, wedge members 66 and 68 cooperate with each other at their wedge surfaces 76 whereby the surfaces slide on each other so that the pins have a variable cross section which correspondingly spaces the caliper 22 from the respective torque arm member. The pins are expansible to eliminate radial and circumferential clearances from the disc brake assembly. Each expansible pin 56 and 58 biases the caliper toward the other expansible pin, and thus maintains the clearances "D" and "E" between the caliper 22 and the respective torque arms 38 and 40. Turning to FIG. 4, it should be noted that the wedge members 66 and 68 are individually removable from the aperture 54. Removal of enlarged end members 74 of spring 72 from engagement with the ends of members 66 and 68 allows the wedge members to be removed from the aperture 54. Consequently, the caliper 22 is removable from the recess 42.

The wedge members 66 and 68 have equal surface areas in contact with the caliper 22 and with the torque arm member arm 40. The surface area of member 68 which is in contact with caliper 22 is equal to the surface area of member 66 in contact with the caliper. Similarly, the area of member 68 in contact with torque arm member 40 is equal to the area of member 66 in contact with the arm member 40. As a result, axial movement of the caliper 22 creates balanced axial friction forces on each of the members 66 and 68. Because the forces on the component parts of pin 58 (members 66 and 68) are balanced, axial movement of the caliper 22 does not cause the pin 58 to loosen or expand in aperture 54. Expansion of the pin 58 in aperture 54 responsive to axial movement of the caliper could lock the caliper to the torque member, thereby preventing proper brake operation.

The pins 56 and 58 are made of polyphenylene sulfide resin. This resin is inherently corrosion-resistant so that the sliding surfaces of the brake remain free of corrosion throughout the service life of the brake. The pins possess adequate mechanical strength when they are fabricated from polyphenylene sulfide resin reinforced with less than 30% to 40% weight of glass fibers. The pins 56 and 58 could also be made from metal, for example, stainless steel.

As illustrated in FIGS. 1 and 4, the enlarged end members 74 of spring 72 are disposed inwardly of the openings 90 of axially extending apertures 52 and 54, each pin members 66, 68 being spaced apart from wall surfaces of aperture 90 to define longitudinal gaps therebetween, as illustrated clearly in FIG. 4. Each enlarged end member 74 presents a flat surface 75 for engaging the flat end of the respective pin. The spring 72 biases the pins 66 and 68 inwardly of aperture 54, so that as pins 66 and 68 slide along their respective inclined surfaces, there is compensation for the manufacturing tolerances existing between the caliper and torque arm member. Each spring 72 also includes a portion 71 which engages a torque arm abutment 41 to maintain the exterior alignment of the spring 72 relative to the torque arm.

Each enlarged end member 74 is disposed within the associated axially extending aperture so that if the pins 66 and 68 should fail, either by damage imparted directly to the pins or failure of the material of the pins, then the end members 74 within the aperture will maintain the caliper in radial and circumferential alignment with torque arms 38 and 40. This occurs because the enlarged end members 74 have a diameter large enough to substantially span the diameter of the aperture. Each end member 74 is no larger than transverse dimension B of wedge members 66 and 68 so that members 66 and 68 normally maintain the position of the caliper, but if the members 66 and 68 should fail, end members 74 are large enough to maintain the position of the caliper. Thus, the enlarged end members 74 of spring 72 will maintain the caliper in radial and circumferential alignment with the torque member 36 and also permit axial movement of the caliper relative to the torque member. Maintenance of the caliper in proper radial and circumferential alignment with the torque member is an important safety device which enables braking operation until the disc brake assembly can be repaired by the insertion of new pins 66 and 68.

Figure 6:
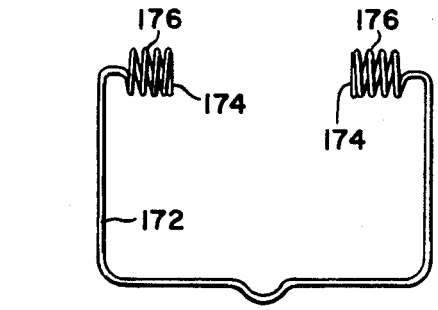
FIG. 6 is an isometric view of an alternative embodiment of the present invention.

Referring to FIG. 6, there is illustrated an alternative embodiment of the spring member which comprises a resilient spring 172 including enlarged end members 174. Enlarged end members 174 include multiple coils 176. Multiple coils 176 not only provide additional inward biasing of the pins 66 and 68, but provide additional coils of the appropriate diameter for maintaining the caliper in alignment with the torque member if the pins are damaged or should fail.

Although the present invention has been illustrated and described in connection with example embodiments, it will be understood that this is illustrative of the invention, and is by no means restrictive, thereof. It is reasonably to be expected that those skilled in the art can make numerous revisions and additions to the invention and it is intended that such revisions and additions will be included in the scope of the following claims as equivalents of the invention.

We claim:

1. A disc brake, comprising a rotor having friction faces on opposite sides thereof, a caliper cooperating with a pair of friction elements to urge the elements into engagement with the friction faces of the rotor to retard rotation of said rotor, a non-rotating torque member carrying said caliper in a substantially fixed circumferential position relative to said torque member, said caliper and torque member having at least a pair of axially extending recesses in registry with one another and the recesses cooperating to define an axially extending aperture between said caliper and torque member, elongated pin members slidably received in said axially extending aperture for movably supporting said caliper relative to said torque member and for normally positioning said caliper in a predetermined circumferential position relative to said torque member, the pin members slidably engaging each other at a surface of each pin members and each pin member having a transverse dimension, and a dual purpose resilient spring engaging and maintaining each pin member within the axially extending aperture, said spring having enlarged end members disposed within the aperture and each presenting a flat surface engaging a respective pin member to bias the respective pin member inwardly of said axially extending aperture, the enlarged end members having a transverse measurement no greater than said transverse dimension, and said enlarged end members disposed within the aperture so as to maintain the cicumferentail position of the caliper relative to the torque member if said pin members fail to effect said circumferential position.

2. The disc brake in accordance with claim 1, wherein said enlarged end members each comprises a coil presenting the flat surface which engages an end of a respective pin member.

3. The disc brake in accordance with claim 1, wherein each enlarged end member comprises a plurality of coils presenting the flat surface which engages an end of a respective pin member and resiliently urging said pin members inwardly of said aperture.

4. The disc brake in accordance with claim 1, wherein said resilient spring traverses an exterior portion of said torque member and engages a protrusion of the torque member to fixedly position the spring relative to the torque member.

5. The disc brake in accordance with claim 1, wherein said pin members comprise a pair of wedge-shaped members substantially coinciding in shape with said axially extending aperture and engaging one another to enclose said aperture and compensate for manufacturing tolerance between said caliper and torque member.

6. In a disc brake assembly having a torque member fixedly disposed adjacent a rotor to be braked, a pair of friction elements engageable with the rotor during braking, a caliper transversely movable relative to said torque member and cooperating with the friction elements to urge the elements into engagement with the rotor, the torque member supporting said caliper in substantially fixed circumferential position relative to said rotor, said caliper and torque member having axially extending recesses in registry with one another and the recesses cooperating to define axially extending apertures between said caliper and torque member, elongated pin members each having a transverse dimension and the pin members slidably received in said axially extending apertures to transversely movably support and circumferentially position said caliper relative to said torque member, and a resilient spring associated with each aperture and having ends engaging the associated pin member to maintain the pin member in the axially extending aperture, characterized in that said resilient spring includes at each end thereof an enlarged end member disposed within said axially extending aperture and presenting a flat surface engaging an associated pin member, each enlarged end member having a transverse measurement no greater than said transverse dimension the transverse measurements of the end members being large enough so that the end members maintain the circumferential position of the caliper relative to the torque member if the associated pin member fails to effect said circumferential position.

7. The disc brake assembly according to claim 6, wherein said enlarged end members each comprise a coil presenting the flat surface which engages an end of a respective pin member.

8. The disc brake assembly according to claim 7, wherein each enlarged end member comprises a plurality of coils for maintaining the associated pin member in the aperture.

9. The disc brake assembly according to claim 7, wherein said resilient spring traverses a portion of the exterior perimeter of said torque member and engages abutment means of said torque member in order to maintain the alignment of said spring relative to said torque member.

* * * * *